United States Patent Office 3,098,701
Patented July 23, 1963

3,098,701
METHOD OF REDUCING WATER EVAPORATION LOSSES IN OPEN RESERVOIRS
Campbell R. McCullough, Rockville, Md., assignor to Monsanto Chemical Company, St. Louis, Mo., a corporation of Delaware
No Drawing. Filed Aug. 11, 1960, Ser. No. 48,845
8 Claims. (Cl. 21—60.5)

The primary object of this invention is to reduce the evaporation losses of water in reservoirs and other water storage facilities in a low cost, efficient, easily-practiced manner.

A further object of this invention is to provide a method for reducing the water loss by evaporation which does not require use of chemical treating agents.

A still further object of this invention is to provide a process for reducing evaporative loss in reservoirs, ponds, pools and other areas where water is stored whereby the said reduction in evaporation can be accomplished at minimum cost and under conditions of minimum expenditure of time for maintenance of the evaporation reducing system.

A still further object of this invention is to enable large savings in the cost of water retention in reservoirs by the application to the surface of the water of a plastic material which has been cut into confetti-sized pieces.

An ancillary feature of the instant invention is to secure low cost water retention in reservoirs by application to the water surface of a plastic material which has been provided with a metalized surface.

A further object of the invention is to reduce the evaporation losses in reservoirs by employment of polyethylene cut into a confetti and then distributed on the water surface.

The loss of water by evaporation from open reservoirs is a serious problem throughout the world. This problem exists in certain parts of the United States which suffer from water shortages, especially those sections where the water supply is acutely short. In the United States alone over 400 million dollars worth of water is being lost annually because of evaporation from open reservoirs. This problem is especially acute since the evaporation takes place after the costs of transporting, pumping, preliminary filtering, and preliminary chemical treatment have already been effected in carrying the water from the natural source to the reservoir (water storage facility).

Certain coating methods whereby the evaporative loss of water is diminished are already known. To a large extent these methods deal with the addition of chemical treating agents to the water in an effort of depress evaporation of water from the top surface of the reservoir. The cost of this water treatment is indeed high, and the initial cost disadvantage is compounded by the fact that this treatment must be repeated in a fairly continual sequence in order to retain the advantage of reduction in evaporation. In an effort to reduce cost of the chemicals used in this treatment, the application of oil films has been tried. This method is unacceptable because of the contamination of the water introduced by application of oil films. The use of long hydrocarbon compounds containing long hydrocarbon chains and a polar hydrophilic group, e.g., alcohols or acids, has been attempted. These methods, although meeting with moderate success, are objectionable from the cost standpoint since the chemical treating agents must be continuously added to regenerate the effect of the anti-evaporation process. This constant regeneration is required because the material seems to disappear in large amounts, due to such probable causes as decomposition, solution, evaporation, etc. The ideal reservoir covering would be one which prevents the transmission of water vapor while at the same time permits the transmission of oxygen and carbon dioxide gases. It should be understood, however, that where the reservoir contains mainly industrial waste water, the necessity that the reservoir covering plastic material allow the escape of carbon dioxide and oxygen gases no longer prevails, as there is generally no requirement with industrial waste water that oxygen and carbon dioxide be allowed undisturbed entrance to and/or exit from the stored waste water. The reservoir covering material must float on the surface of the water and therefore should have a specific gravity less than 1. In cases where the reservoir contains water which is to be used for drinking, the covering material must not be toxic, nor cause the formation of toxic materials in the water under practical conditions of use. Also in such a situation, it is desirable that the material not interfere with the normal biological environment present in the water. The material and its application must be inexpensive enough so that the cost of its use and maintenance is generally less than the value of the water saved by the reservoir covering. This cost factor would not be as stringent in cases where the shortage of water is a serious one, especially in areas where the weather environment is essentially an arid one, since under those conditions the demand for water invariably exceeds the supply and it would be cheaper to spend a slight additional amount in cost to retain the water already procured from distant sources than to acquire a new supply thereof. In such a situation higher costs are justified. Of course in the solution to the problem as proposed by the instant invention the added advantages of low cost, low maintenance, non-toxicity, and absence of deleterious effects on fish and plankton (as well as natural bacteria and other biological life present within the stored water) offers an extremely desirable solution to the problem of evaporation losses. These advantages, especially insofar as the biological environment of the body of water is concerned, are quite important since even a slight unbalance in said environment might well result in ultimate water quality impairment.

Any inert plastic material can be employed in the practice of this invention as long as it: (1) has a specific gravity low enough to enable it to float on water; and (2) is insoluble in water. The plastic, being inert, does not react with the water causing either the decomposition of the plastic, or the production of obnoxious, toxic byproducts. Generally, of course, the specific gravity of the plastic chosen will be less than 1.0; but in certain circumstances (e.g., where the water density due to the individual environmental constitution thereof is higher than 1.0) the use of plastics with a specific gravity of 1.0 or slightly higher may be tolerated. Water with an appreciable amount of dissolved or dispersed minerals or mineral salts contained therein might allow use of a plastic of specific gravity of 1.0 or slightly higher.

While the invention has been discussed largely in connection with open reservoirs where the surface of the water is exposed to solar radiation, the invention is also applicable to closed reservoirs. Although closed reservoirs do not account for as large a water evaporation loss as open reservoirs, nevertheless the evaporation problem still exists therein. The present invention provides a convenient, low cost solution to the water evaporation problem whether it exists in open or closed water storage areas.

Polyethylene prepared by either high pressure or low pressure polymerization and having densities from 0.9 to about 0.98 can be used. Polyethylene film, in general, has the desirable properties of transmitting oxygen and carbon dioxide, but not allowing substantial transmission of water vapor. A large number of polymers of ethylene, including both homopolymers of ethylene and ethylene copolymers with other comonomers can be employed. Accordingly the term "ethylene polymer" as used herein and in the claims is intended to include the products obtainable by polymerizing ethylene alone or with other polymerizable materials, especially those having ethylenic unsaturation.

In addition to homopolymers of polyethylene, polyethylene copolymers can be employed in the form of thin films according to the instant invention. While a great latitude in the selection of polymers and copolymers having the desired properties (especially a specific gravity less than 1.0) exists, the following are listed as exemplary copolymers: ethylene-vinyl acetate; ethylene-methylacrylate; ethyleneacrylic acid copolymer; ethylene-methacrylic acid copolymer; ethylene-methylmethacrylate; ethylene-vinylidenechloride; ethylene-vinylchloride; ethylene-vinylidenefluoride; ethylene-vinylfluoride; ethylene-vinyloxyethanol; ethylene-vinylidenechloridefluoride; ethyleneacrylonitrile; ethylene-propylene; ethylene-butylene; etc. The plastic materials employed herein can be homopolymers of ethylene with other comonomers which possess mono-alpha-olefinic unsaturation, such as the copolymers listed above. In fact any polymer of hydrocarbon monoolefinically unsaturated monomers of from two to 10 or more carbon atoms can be employed, e.g., homopolymers and copolymers of ethylene, propylene, 1-butene, 1-hexene, 1-octene. These monoolefinically unsaturated hydrocarbon monomers can be copolymerized with one another, or with other comonomers such as those enumerated above in conjunction with the ethylene copolymer. The overriding consideration in selection of the polymer is that it should have a specific gravity less than 1.0. Any insert polymer can be used as long as it has a specific gravity less than 1.0, and is water-insoluble. The preferable percent of comonomer should not exceed 10 percent, but the copolymer can contain any amount of comonomer as long as the specific gravity of the copolymer is less than 1.0.

Various ultra-violet absorbents and stabilizers (e.g., carbon black) may be added to the above mentioned homopolymers and copolymers to improve their aging properties. As exemplary of suitable U-V absorbents the following can be named: 2,4-dibenzoyl resorcinol, 2,4-dihydroxybenzophenone; 2-hydroxy-4-methoxybenzophenone, etc.

An improvement in reflectance of the plastic films, as contemplated by the present invention, can be achieved by providing the film with reflecting properties. This can be accomplished for example by incorporating into the polymer small "pigment-sized" particles of metallic or metallic oxide materials. As exemplary of such metal particles, aluminum, copper, bronze, and titanium dioxide particles can be named. These particles can be blended with the plastic material in the ratio of approximately 0.5 to 2.0 grams of metal or metal oxide pigment per pound of polymer. Another method of securing a reflecting surface on the plastic material is by metallizing the surface or surfaces thereof, such as e.g., by thermal evaporation in vacuo, cathodic sputtering, dipping, silk screening, etc. Although the cost of employing these metallized plastic materials slightly exceeds the cost of plastics without such reflecting surfaces, the increase in reflectance (and accompanying increase in efficiency of the evaporation reducing system) makes the use of metallized film worthwhile. This is not to state, however, that the plastic film-confetti will not function in reducing evaporation when there is no metal reflective surface applied thereto. The plastic film alone exhibits fine efficiency in preventing substantial evaporative losses from reservoirs.

The actual mechanism of the reduction of evaporation by use of the plastic film pieces is not completely understood. It is clear that the absorption of solar radiation by the water is one of the main driving forces for evaporation. Apparently the major effect of the plastic film of this invention is the reduction of the rate of diffusion of water molecules from the water surface into the air. However, the effectiveness of the plastic film covering may also be due to the relatively poor heat absorption characteristics of the plastic film as it exists floating on the water surface. In any event the invention contained herein is not to be considered as limited by, or dependent for its operation upon these or any other theories, as the invention is limited only by the claims appended hereto.

Various treatments may be applied to one surface or both surfaces of the polymer film in order to increase its hydrophilicity. This is desirable inasmuch as it tends to attract a thin film of water on the water contacting surface of each particle of "confettied" plastic. The plastic film may be provided with an increase in hydrophilic properties on either one or both surfaces thereof. The plastic film surfaces can readily be rendered more hydrophilic by "physical" treating methods such as, for example, oxidizing flame treatment as disclosed in the patents to Kriedel, U.S. Patent 2,632,921; Kritchever, U.S. Patents 2,648,097 and 2,683,894; Loukomsky, U.S. Patent 2,767,103; Grow et al., U.S. Patent 2,759,820; or by corona discharge treating as indicated in Belgian Patent 510,068; French Patent 1,058,934, and the Bloyer article which appears in the July 1955 issue of Modern Plastics magazine. "Chemical" treating processes to render the alkyl hydrocarbon polyolefin polymers more hydrophilic include such methods as, for example, application to the film surface or surfaces of a strong sulfuric acid-sodium dichromate solution which may be prepared by saturating concentrated sulfuric acid with technical sodium dichromate. The surface is prepared simply by passing it through a bath of the oxidizing solution and then washing in water and drying. Ozone treatment such as disclosed in U.S. Patents 2,715,075 and 2,715,076 can also be used to increase the hydrophilicity of the plastic film. The plastic film may also be subjected to sulfonation by the application thereto, either in the initial blend of the polymer or when it has been already formed into a film, a suitable sulfonating agent, e.g., sulfonyl chloride. The sulfonation procedure, however, is least preferred since it is comparatively difficult to carry out, and substantially increases the cost of the evaporation reduction. Another way of increasing the hydrophilic properties of the plastic film is to coat the film with a long-chain alcohol such as, for example, cetyl alcohol, octadecanol, hexadecanol, etc. This latter procedure has the disadvantage of relatively high cost, and is not ordinarily justified except in cases where the loss of water by evaporation is exceptionally high and the water supply source is subject to rapid depletion, such as in extremely arid regions. In general the physical treatments as indicated above are preferred because of the lower initial cost involved, lack of necessity for regeneration, and the rapidity with which the plastic material can be rendered more hydrophilic.

The thickness of the film employed may vary within a wide range depending upon the cost factor as a limiting consideration. For example films in the thickness range of 0.0001 inch to 0.010 inch can be used. The preferred thickness of the plastic film is about 0.00025 inch to 0.0025 inch in thickness. The most preferred thickness is about 0.015 mm. (0.00059 inch). The pieces of film may range in size from extremely small pieces (approximately $\frac{1}{16}$ of an inch in length) to larger pieces (approximately six inches long). The width may likewise vary from about $\frac{1}{16}''$ to six inches. The pieces may be of any shape, such as: rectangular, square, triangular, circular, elliptical, etc. In general the normal "confetti-sized" pieces will be preferred. The area of each piece of film may vary from about $\frac{1}{64}$ in.$^2$ to about 36 in.$^2$.

It is also possible to use large sheets of thin plastic film (with or without a reflective metallized or metal pigmented surface) anchored to the bottom of the reservoir by suitable weights. This procedure can be employed in water storage areas which are not normally employed for recreational uses, although the anchoring does increase the cost of carrying out the evaporation reduction method.

A test procedure is performed by cutting a piece of 0.015 mm. (0.00059 in.) thick polyethylene film into confetti-sized pieces. These are sprinkled onto water contained in a large bucket, and they spread quickly, substantially evenly covering the surface of the water. Stirring forced some of the material beneath the surface, but it rose again and matched up with other pieces adjacent thereto to substantially cover the surface with an even, relatively homogeneous skin of the polyethylene confetti. Blowing on the surface resulted in motion of the skin where it was free to move; but the skin did not appear to pile up on itself under these forces. A reduction in evaporation loss of at least 50% is observed. While the specific efficiency of reduction in evaporation will vary according to the environmental circumstances encountered, reduction in evaporation of at least 50% can generally be expected.

While the skin did not substantially pile up on itself, prolonged exposure to severe solar radiation over long periods of time may cause the pieces of plastic to stick to one another especially in locations where the wind velocity and/or waving action are significant factors. Under such environmental conditions, in order to insure a substantial covering of the water surface, the plastic film can be microscopically roughened to obviate sticking of the pieces together, which could cause "pile-ups." This microscopic roughening can be accomplishing by many procedures, e.g., casting the film on a drum which has a pitted surface; casting the film on a conveyor belt or other surface which has microscopically-sized indentations or depressions on the casting surface thereof; incorporating in the polymer during polymerization thereof (or prior to blowing it into a film) minor amounts of inorganic filler particles such as chalk ($CaCO_3$), $SiO_2$, etc. The microscopically roughened effect may also be achieved either by incipient precipitation of a plasticier incorporated into the film, or by employing unrefined (raw) polyethylene polymer to produce the film. By "unrefined polyethylene" is meant the polyethylene direct from polymerization. It has a pebble-like surface and can be used to prevent pile-ups. Other methods of achieving this effect will be evident to those skilled in the art.

The size and thickness of the plastic material employed may be varied to suit the particular environmental conditions. The situations of use are subject to many variables, such as wind velocity, waving action, varying intensities of solar radiation, etc. The only requirement of the method being that the pieces of plastic which form the "skin" substantially cover the water surface. Thus the invention disclosed herein and the application thereof is subject to wide variation. In arid regions where the wind velocity is extremely high, the use of large sheets of plastic film anchored to the bottom of the open reservoir may be justified on a cost basis. In view of the fact that the annual evaporation losses of water for the United States as a whole are an estimater 20 million acre-feet per year, and in the eleven western states (not including Texas or Oklahoma) evaporation loss of water constitutes approximately 11 million acre-feet per year; the method as disclosed in the present invention offers an efficient, low cost way of increasing water conservation. When compared with the cost of the saline water demonstration plants which give promise of water at a cost of 165 to 330 dollars per acre-foot (.50 to 1.00 per 1,000 gallons), the economic value of the instant invention becomes obvious.

If desired the plastic can have coloring materials incorporated therein. This creates an ornamental effect and serves to beautify the reservoir or other water storage facility. Suitable coloring materials include, for example: organic pigments (except those prone to bloom and migrate); lakes; vat dye pigments; blue and green phthalocyanine pigments; selected hydrocarbon soluble dyes, etc. The colored pieces of plastic can be stamped or cut into various shapes to resemble normal aquatic pond environment, e.g., fish water-lily leaves, etc. Thus both the functional (evaporation-reduction) and aesthetic (enhancement in physical appearance) objectives of the reservoir can be furthered by the same material with but a minor increase in expenditure.

The body of water with the top surface substantially covered by pieces of the plastic polymer film is one which is resistant to water losses due to evaporation and is likewise within the purview of the instant invention.

I claim:
1. The method of reducing evaporative losses of water in open reservoirs which comprises substantially covering the surface of the water with pieces of a thin, solid and flexible polyethylene polymer film selected from the group consisting of: homopolymers of ethylene and copolymers of ethylene and wherein the said polyethylene film has been rendered hydrophilic.
2. The method of claim 1 wherein the polyethylene film has been rendered hydrophilic by corona discharge treatment.
3. The method of claim 1 wherein the polyethylene film has been rendered hydrophilic by oxidizing flame treatment.
4. The method of reducing evaporative losses of water in open reservoirs which comprises substantially covering the surface of the water with confetti-sized pieces of a polyethylene polymer solid film approximately 0.010 to 0.020 mm. in thickness.
5. The method as in claim 4 wherein the polyethylene polymer has incorporated therein 0.1 to 2.0 grams of aluminum powder per pound of polymer.
6. The method of claim 4 wherein the polyethylene film has applied to at least one surface thereof a metallized film of aluminum.
7. The method of claim 4 wherein the polyethylene polymer has incorporated therein an ultra-violet absorbing agent.
8. The method of claim 4 wherein the pieces of polyethylene polymer film are rectangular in shape and have a length in the range of 2/16 inches to 1 inch.

References Cited in the file of this patent
FOREIGN PATENTS
1,378,028    Australia _____ Dec. 31, 1928

OTHER REFERENCES
Sebba et al., J. of the Chem. Soc., January-June 1940, pp. 106–114.
Chem. Eng., September 1957, vol. 64, No. 9, p. 180.